United States Patent
Salvador et al.

(10) Patent No.: US 8,192,879 B2
(45) Date of Patent: Jun. 5, 2012

(54) METHOD FOR MAXIMUM NET POWER CALCULATION FOR FUEL CELL SYSTEM BASED ON ONLINE POLARIZATION CURVE ESTIMATION

(75) Inventors: John P. Salvador, Penfield, NY (US); Sriram Ganapathy, Rochester, NY (US); Kiran Mallavarapu, Honeoye Falls, NY (US); Frank X Leo, Honeoye Falls, NY (US); Balasubramanian Lakshmanan, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1152 days.

(21) Appl. No.: 12/027,042

(22) Filed: Feb. 6, 2008

(65) Prior Publication Data
US 2009/0197125 A1 Aug. 6, 2009

(51) Int. Cl.
*H01M 8/04* (2006.01)
(52) U.S. Cl. .......... 429/430; 429/431; 429/432
(58) Field of Classification Search .......... 429/428–432
See application file for complete search history.

(56) References Cited

U.S. PATENT DOCUMENTS

| | | | |
|---|---|---|---|
| 6,794,844 B2 * | 9/2004 | Hochgraf et al. | 320/101 |
| 6,847,188 B2 * | 1/2005 | Keskula et al. | 320/101 |
| 7,124,040 B2 * | 10/2006 | Engelhardt et al. | 702/58 |
| 7,569,293 B1 * | 8/2009 | Cross, III | 429/412 |
| 2004/0224192 A1 * | 11/2004 | Pearson | 429/13 |
| 2006/0166051 A1 * | 7/2006 | Murthy et al. | 429/13 |
| 2006/0194082 A1 * | 8/2006 | Tucker et al. | 429/9 |
| 2008/0182139 A1 * | 7/2008 | Ganapathy et al. | 429/13 |

* cited by examiner

*Primary Examiner* — Barbara Gilliam
*Assistant Examiner* — Maria J Laios
(74) *Attorney, Agent, or Firm* — John A. Miller; Miller IP Group, PLC

(57) ABSTRACT

An algorithm for determining the maximum net power available from a fuel cell stack as the stack degrades over time using an online adaptive estimation of a polarization curve of the stack. The algorithm separates the current density range of the stack into sample regions, and selects a first sample region from the far left of the estimated polarization curve. The algorithm then calculates the cell voltage for that current density sample region, and determines whether the calculated cell voltage is less than or equal to a predetermined cell voltage limit. If the calculated cell voltage is not less than the cell voltage limit, then the algorithm selects the next sample region along the polarization curve. When the calculated cell voltage does reach the cell voltage limit, then the algorithm uses that current density for the sample region being analyzed to calculate the maximum power of the fuel cell stack.

20 Claims, 3 Drawing Sheets

METHOD FOR MAXIMUM NET POWER CALCULATION FOR FUEL CELL SYSTEM BASED ON ONLINE POLARIZATION CURVE ESTIMATION

BACKGROUND OF THE INVENTION

1. Field of the Invention

This invention relates generally to an algorithm for determining the maximum power available from a fuel cell stack as the stack degrades over time and, more particularly, to an algorithm for determining the maximum power available from a fuel cell stack using an online polarization curve estimation process as the stack degrades over time.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The stack controller needs to know the current/voltage relationship, referred to as a polarization curve, of the fuel cell stack to schedule reactants in accordance with power demands. The relationship between the voltage and the current of the stack is typically difficult to define because it is non-linear, and changes depending on many variables, including stack temperature, stack partial pressures and cathode and anode stoichiometries. Additionally, the relationship between the stack current and voltage changes as the stack degrades over time. Particularly, an older stack will have lower cell voltages, and will need to provide more current to meet the power demands than a new, non-degraded stack.

Fortunately, many fuel cell systems, once they are above a certain temperature, tend to have repeatable operating conditions at a given current density. In those instances, the voltage can be approximately described as a function of stack current density and age.

SUMMARY OF THE INVENTION

In accordance with the teachings of the present invention, an algorithm is disclosed for determining the maximum net power available from a fuel cell as the fuel cell stack degrades over time using an online adaptive estimation of a polarization curve of the stack. The algorithm first obtains estimation parameters from the fuel cell system, such as average cell voltage and minimum cell voltage, and estimates a polarization curve for the stack for both an average cell voltage and a minimum cell voltage, respectively. The algorithm then calculates the maximum power available from the stack for both the average cell voltage and the minimum cell voltage from the polarization curve estimation. To do this, the algorithm separates the current density range of the stack into sample regions, and selects a first sample region from the far left of the estimated polarization curve. The algorithm then calculates the cell voltage for that current density sample region, and determines whether the calculated cell voltage is less than or equal to a predetermined cell voltage limit. If the calculated cell voltage is not less than the cell voltage limit, then the algorithm selects the next sample region along the polarization curve. When the calculated cell voltage does reach the cell voltage limit, then the algorithm uses that current density for the sample region being analyzed to calculate the maximum power of the fuel cell stack. The algorithm then selects the lesser of the maximum power for both the average cell voltage and the minimum cell voltage as the maximum fuel cell system output voltage.

Additional features of the present invention will become apparent from the following description and appended claims, taken in conjunction with the accompanying drawings.

DETAILED DESCRIPTION OF THE EMBODIMENTS

Figure 1:
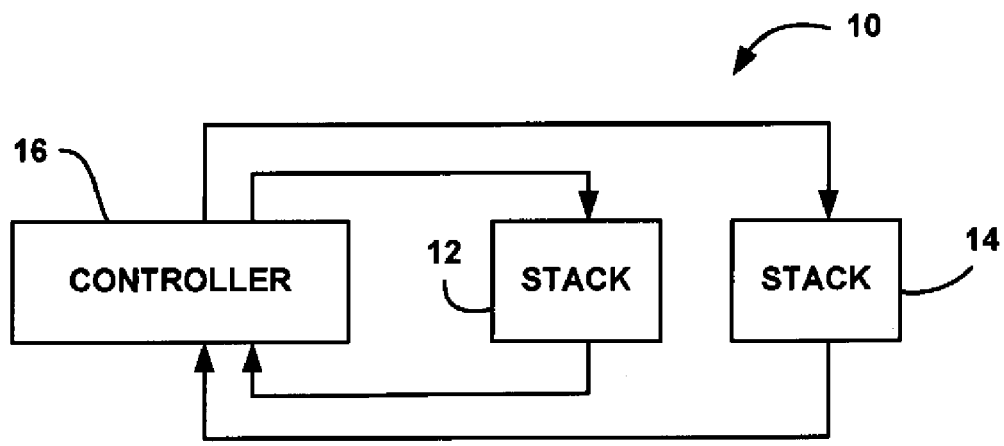
FIG. 1 is a block diagram of a fuel cell system including split stacks and a controller.

The following discussion of the embodiments of the invention directed to an algorithm for determining the maximum net power available from a fuel cell system as the fuel cell stack degrades over time using an online polarization curve estimation process is merely exemplary in nature, and is in no way intended to limit the invention or it's applications or uses.

Many control parameters of a fuel cell system require knowledge of the polarization curve of the fuel cell stack, such as knowing the maximum voltage potential and current draw available from the fuel cell stack. As mentioned above, as the stack ages, the stack polarization curve also changes as a result of stack degradation. U.S. patent application Ser. No. 11/669,898, filed Jan. 31, 2007, titled Algorithm for Online Adaptive Polarization Curve Estimation of a Fuel Cell Stack, assigned to the Assignee of this application and herein incorporated by reference, discloses an algorithm for calculating the polarization curve of a fuel cell stack online as the fuel cell system is being operated. The algorithm of the '898 application estimates two or more stack parameters from collected data as the stack is being operated, and uses the parameters to calculate the polarization curve. When the fuel cell stack is running and certain data validity criteria have been met, the algorithm goes into a good collection mode where it collects stack data, such as stack current density, average cell voltage and minimum cell voltage. When the stack is shut-down, the algorithm uses a cell voltage model to solve a non-linear least squares problem to estimate predetermined parameters that define the polarization curve. If the estimated parameters satisfy certain termination criteria, then the estimated parameters are stored to be used by a system controller to calculate the polarization curve of the stack for future stack runs.

The present invention proposes an algorithm for determining the maximum net power available from a fuel cell stack using an online polarization curve estimation process, such as that disclosed in the '898 application. The algorithm uses previously saved estimation parameters to generate the polarization curve online, and calculates a maximum net power from the system based on stack health. As the parameters vary with the life of the stack, so does the maximum net power. The algorithm provides the vehicle controller with an estimate of the maximum power available from the stack. It can use this information to change the way it distributes power requests to the battery and the fuel cell stack.

From this, the reliability of the fuel cell system is improved if the vehicle does not request more power from the stack than it can produce. For example, assume a fuel cell module can typically provide 90 kW, but stack voltage has degraded so that it can only provide 80 kW. If 85 kW is requested, the balance of plant set-points will go to 85 kW even though the stack cannot produce that much power. Further, information of predicted maximum power level will be available for service personnel if the stack needs servicing. If the maximum power level is significantly degraded, the fuel cell system can modify set-points to enhance vehicle reliability. During system start-up, the rate at which the stack is initially loaded CAN be reduced as a result of a reduced power output. Although it will take longer for the vehicle to drive away, the risk of failed start-ups is reduced. Further, extra thermal loads can be turned on when the fuel cell system is warming up. A degraded stack often has a reduced ability to manage liquid water. Additional stack warming will quickly reduce the risk of unstable operation. If the stack is heavily degraded, relative humidity set-points can be modified to better manage liquid water.

FIG. 1 is a block diagram of a fuel cell system 10 including a first split stack 12, a second split stack 14 and a controller 16. The controller 16 receives information from the split stacks 12 and 14, and controls the split stacks 12 and 14. The controller 16 uses the information to calculate the polarization curve of the stacks 12 and 14 in real time, and provide the maximum net power available from the stacks 12 and 14.

Figure 2:
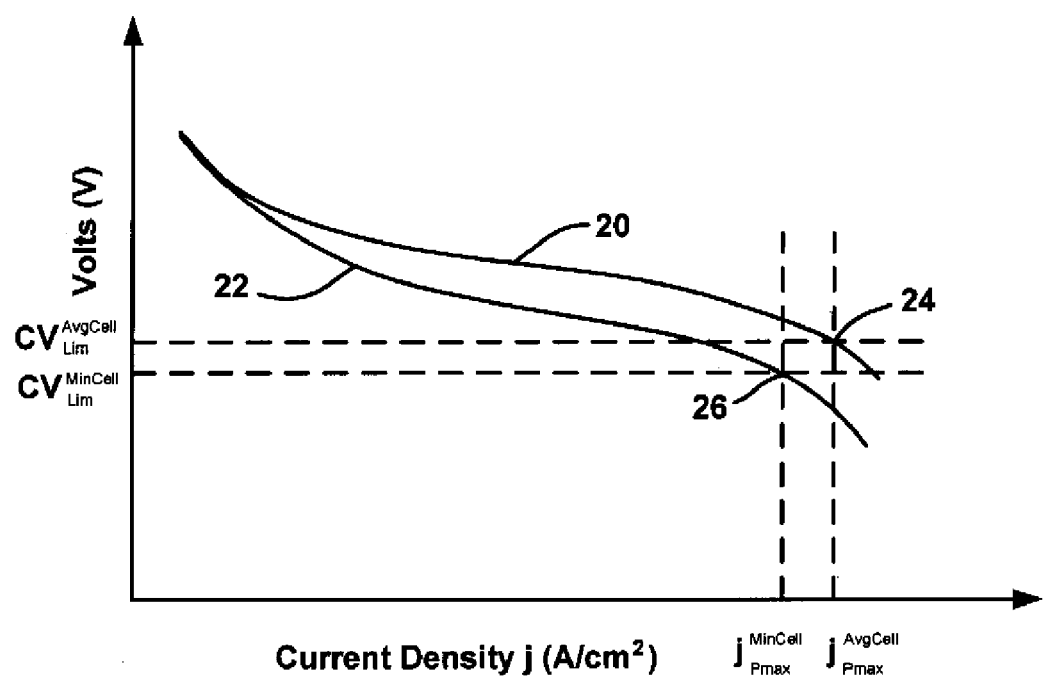
FIG. 2 is a graph with fuel cell stack current density on the horizontal axis and fuel cell stack voltage on the vertical axis showing a polarization curve for a minimum cell in the fuel cell stack and an average cell in the fuel cell stack.

In order to determine the maximum net power from the fuel cell stacks 12 and 14, the present invention uses the average cell voltage of the stacks 12 and 14 and the minimum cell voltage of the stacks 12 and 14. FIG. 2 is a graph with current density on the horizontal axis and voltage on the vertical axis. The graph includes two polarization curves, namely polarization curve 20 for the average cell voltage and polarization curve 22 for the minimum cell voltage. Point 24 represents the maximum current (or current density) available from the stacks 12 and 14 for the average cell polarization curve and point 26 represents the maximum current available from the stacks 12 and 14 for the minimum cell polarization curve 22.

Figure 3:
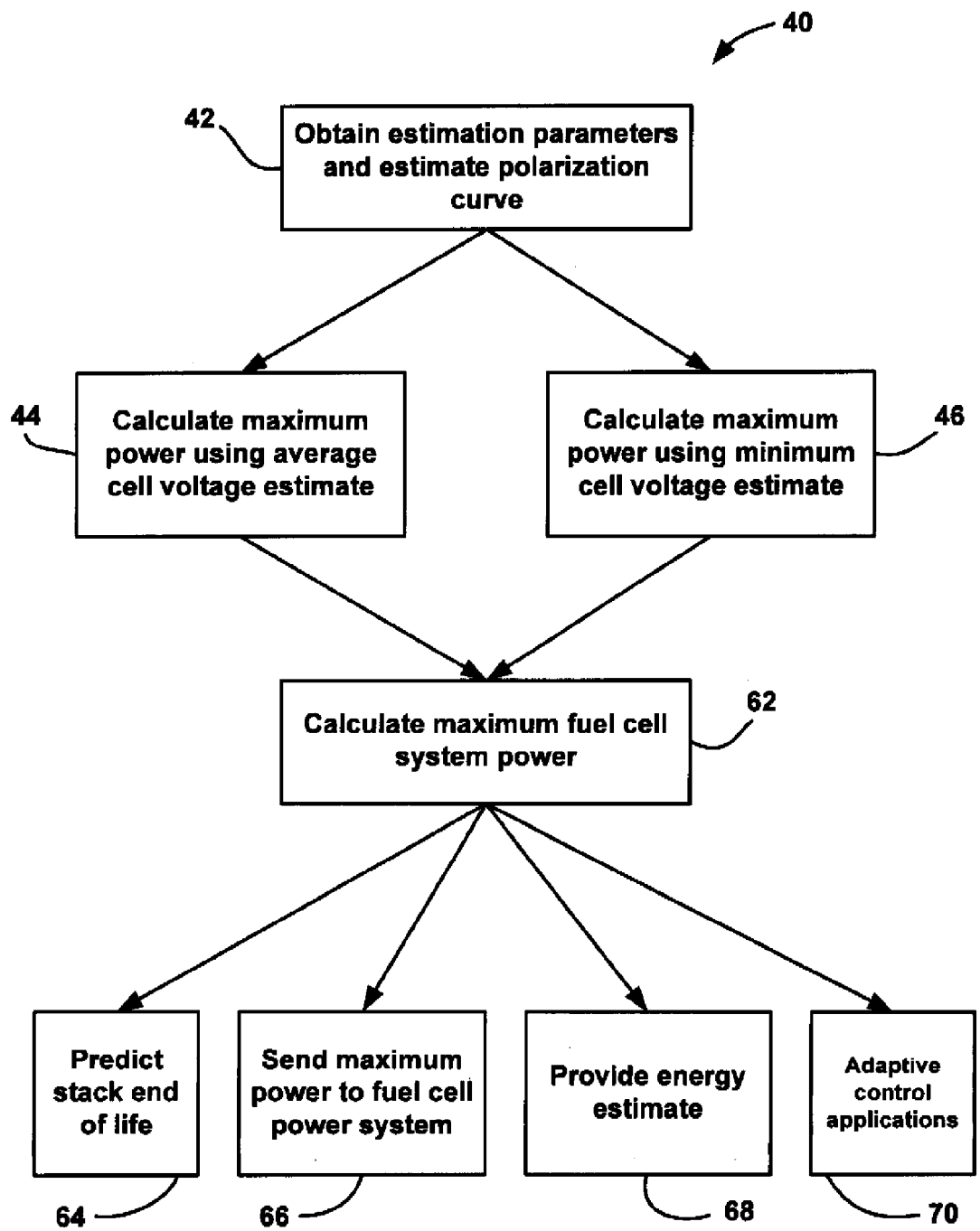
FIG. 3 is a flow chart diagram showing a process for determining the maximum fuel cell stack power at any particular point in time for a fuel cell stack, according to an embodiment of the present invention.

FIG. 3 is a flow chart diagram 40 showing a process of the invention for determining the maximum net fuel cell stack output power at any given time during fuel cell operation, and the applications for which this calculated power value can be used. At box 42, the algorithm obtains the parameters from a non-volatile memory that are used to estimate the polarization curves for the stacks 12 and 14 from, for example, the process disclosed in the '898 application. Further, the algorithm sets an average cell voltage limit $CV_{Lim}^{Avgcell}$ at box 42 and a minimum cell voltage limit $CV_{Lim}^{mincell}$ at box 44. In one non-limiting example, the average cell voltage limit can be about 0.525 V and the minimum cell voltage limit can be about 0.3 V for a 230 V, 440 cell fuel cell stack. The algorithm then calculates the maximum net power available from the fuel cell stacks 12 and 14 using the average cell voltage limit $CV_{Lim}^{Avgcell}$ at box 42 and calculates the maximum power using the minimum cell voltage limit $CV_{Lim}^{mincell}$ at box 46.

Figure 4:
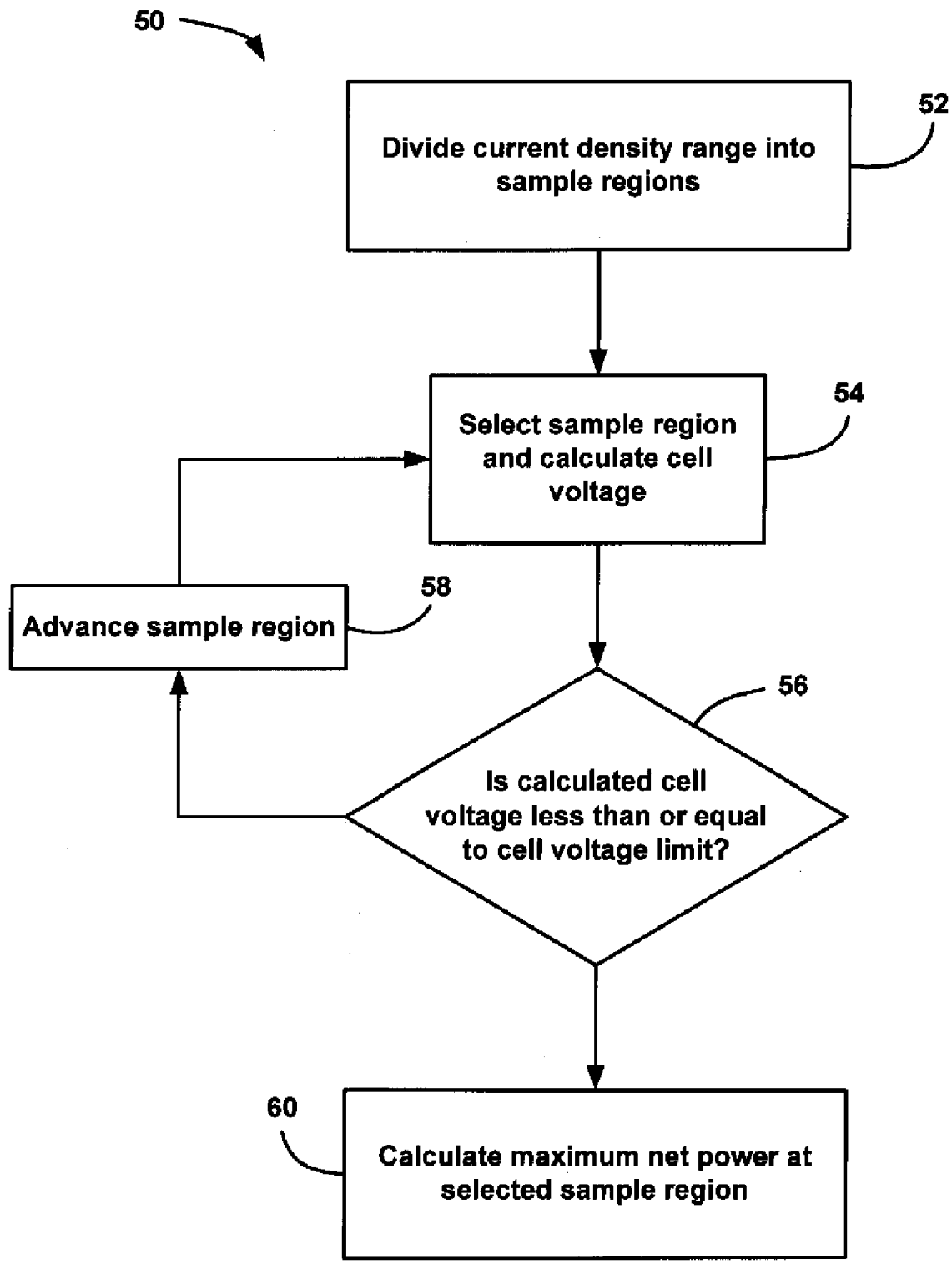
FIG. 4 is a flow chart diagram showing a process for calculating the maximum fuel cell stack power, according to an embodiment of the present invention.

FIG. 4 is a flow chart diagram 50 showing a process for determining the maximum net power for both the average cell voltage and the minimum cell voltage, according to an embodiment of the present invention. The process starts at the far left of the polarization curves 20 and 22 and moves down along the curves 20 and 22 until the average cell voltage limit $CV_{Lim}^{Avgcell}$ and the minimum cell voltage limit $CV_{Lim}^{mincell}$ at points 24 and 26 are reached. At box 52, the algorithm divides the current density range of the stacks 12 and 14 into N sample regions, where k identifies the specific sample region being analyzed. In one non-limiting example, the current density range can be 0.1-2.0 A/cm² and the sample regions can be every 0.1 A/cm². The algorithm then obtains a current density j for the sample region being examined, and calculates the cell voltage at that current density j for both the average cell voltage and the minimum cell voltage using the polarization curves 20 and 22. In one non-limiting example, the cell voltage at the specific current density is calculated as:

$$E_{cell} = E_{rev} - (j+a)*R_{HFR} - \left(0.07*\log_{10}\left(\frac{j+a}{j^0}\right) + c\log_{10}\left(1 - \frac{j}{j^\infty}\right)\right)$$

Where, $E_{cell}$ is the cell voltage (V),
j is the current density (A/cm²),
$R_{HFR}$ is the cell HFR resistance (ohm cm²),
$E_{rev}$ is the thermodynamic reversible cell potential (V),
α is the background current density from cell shorting/cell crossover (A/cm²),
$j^0$ is the exchange current density (A/cm²),
$j^\infty$ is the limiting current density (A/cm²), and
c is the mass transfer coefficient.

Once the cell voltage is calculated, the algorithm determines whether the calculated cell voltage $E_{cell}$ for that current density j is less than the predetermined cell voltage limit $CV_{Lim}^{Avgcell}$ or $CV_{Lim}^{mincell}$ at decision diamond 56 and, if not, the algorithm moves to the next sample region k at box 58 to calculate the average cell voltage and the minimum cell voltage at the box 54 for the new higher current density j. If the calculated cell voltage is less than or equal to the cell voltage limit $CV_{Lim}^{Avgcell}$ or $CV_{Lim}^{mincell}$ at the decision diamond 56, then the algorithm sets the current density j for the particular sample region as the maximum current density, and calculates the maximum power at box 60. The gross power is calculated as voltage times current where the maximum current density j is multiplied by the number of cells $N_{cells}$ and the area $A_{cells}$ of the cells to get the total current of the stacks 12 and 14. Further, a parasitic power estimation based current density (provided by a look-up table or suitable parasitic estimation algorithm) is subtracted from the power and a correction is added to get the maximum net power $P_{max}{}^X$ as:

$$P_{max}{}^X = (CV_{max}{}^X * N_{cells} * j_{Pmax}{}^X * A_{cells}) - \text{parasitics} + \text{correction}$$

The gross power is how much the stack is producing and the net power is the gross power minus the parasitic power to operate the fuel cell system, such as operating the compressor, cooling fluid pumps, etc. Typically, tables are generated where the parasitic power is defined for a particular current density j based on experiments and the like. The correction is typically determined empirically and is generally around 5% of the maximum power.

Once the algorithm has the maximum net power $P_{max}{}^X$ for the average cell voltage and the minimum cell voltage for both of the stacks 12 and 14, the algorithm determines the maximum fuel cell system net power $P_{max}{}^{FCS}$ as the minimum of the two maximum net powers $P_{max}{}^X$ for each stack 12 and 14 at box 62 in the flow chart diagram 40.

Another non-limiting embodiment for calculation of maximum net power, which can be applied to N number of stacks, can be given by:

$$P_{max}{}^{FCS} = \min(\max(\text{AvgCellPowerEstimations}), \min(\text{MinCellPowerEstimations}))$$

Once the algorithm has the maximum net power $P_{max}{}^{FCS}$ that can be drawn from the stacks 12 and 14 at any particular time, this value is then used in various applications in the fuel cell system 10, such as predicting the number of hours before the end of life of the stacks 12 and 14 at box 64, sending the maximum power to the fuel cell power system at box 66, providing an energy estimate for acceptable drivability at box 68 and using the maximum power in adaptive control applications at box 70.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for estimating the maximum stack power from a fuel cell stack during operation of the fuel cell stack, said method comprising:
executing at any time during operation of the fuel cell stack, using at least one computing device coupled to a memory, instructions for:
selecting an average cell voltage limit;
selecting a minimum cell voltage limit;
estimating a separate polarization curve of the fuel cell stack for both an average cell voltage and a minimum cell voltage;
executing an algorithm to determine a maximum current density for each of the average cell voltage polarization curve and the minimum cell voltage polarization curve, the algorithm including:
separating a current density range of the fuel cell stack into a predetermined number of sample regions in ascending order;
selecting a first sample region and a current density corresponding to the first sample region;
calculating an average cell voltage and a minimum cell voltage at the current density selected for the first sample region being examined;
determining whether the average cell voltage is less than the average cell voltage limit;
selecting a next sample region in the current density range and a current density corresponding to the next sample region if the average cell voltage is not less than the average cell voltage limit;
setting the current density selected for the sample region being examined as the maximum current density for the average cell voltage polarization curve when the average cell voltage is less than the average cell voltage limit;
calculating a maximum net power using the maximum current density estimated at the average cell voltage limit;
determining whether the minimum cell voltage is less than the minimum cell voltage limit;
selecting a next sample region in the current density range and a current density corresponding to the next sample region if the minimum cell voltage is not less than the minimum cell voltage limit;
setting the current density selected for the sample region being examined as the maximum current density for the minimum cell voltage polarization curve when the minimum cell voltage is less than the minimum cell voltage limit;
calculating a maximum net power using the maximum current density estimated at the minimum voltage limit; and
selecting as the maximum stack power, the lesser of the maximum net power using the maximum current density estimated at the average cell voltage limit and the maximum net power using the maximum current density estimated at the minimum voltage limit.

2. The method according to claim 1 wherein calculating the net power includes calculating the net power as a maximum cell voltage times an overall current density times a number of fuel cells in the fuel cell stack times an area of the fuel cells of the fuel cell stack minus a predetermined parasitic power that are used while running the fuel cell stack.

3. The method according to claim 2 further comprising adding a correction to the calculated maximum power.

4. The method according to claim 1 wherein determining an average cell voltage and a minimum cell voltage includes using the equation:

$$E_{cell} = E_{rev} - (j+a) * R_{HFR} - \left(0.07 * \log_{10}\left(\frac{j+a}{j^0}\right) + c\log_{10}\left(1 - \frac{j}{j^\infty}\right)\right)$$

where $E_{cell}$ is the cell voltage, j is the current density, $R_{HFR}$ is the cell HFR resistance, $E_{rev}$ is the thermodynamic reversible cell potential, $\alpha$ is the background current density from cell shorting/cell crossover, $j^D$ is the exchange current density, $j^\infty$ is the limiting current density and c is the mass transfer coefficient.

5. The method according to claim 1 wherein the average cell voltage limit is about 0.525 V and the minimum cell voltage limit is about 0.3 V.

6. The method according to claim 1 wherein separating a current density range of the fuel cell stack into a predetermined number of sample regions includes separating a current density range of 0.1-2.0 A/cm² into sample regions of 0.1 A/cm².

7. The method according to claim 1 wherein selecting a next sample region in the current density range includes selecting the next sample region in order from a low current density in the range to a high current density in the range.

8. The method according to claim 1 wherein the fuel cell stack is a split fuel cell stack where the maximum stack power is determined for both spilt stacks.

9. A method for estimating the maximum stack power from a fuel cell stack during operation of the fuel cell stack, said method comprising:
executing during operation of the fuel cell stack, using at least one computing device coupled to a memory, instructions for:
selecting at least one cell voltage limit for a fuel cell in the fuel cell stack;
estimating a polarization curve of the fuel cell stack for at least one cell;
separating a current density range of the fuel cell stack into a predetermined number of sample regions;
selecting a first sample region;
determining a cell voltage at a current density for the selected sample region;
determining whether the cell voltage is less than the cell voltage limit;
selecting a next sample region in the current density range if the cell voltage is not less than the cell voltage limit; and
calculating a maximum net power for the cell voltage if the cell voltage is less than the cell voltage limit.

10. The method according to claim 9 wherein selecting at least one cell voltage limit includes selecting an average cell voltage limit corresponding to an average cell voltage polarization curve and a minimum cell voltage limit corresponding to a minimum cell voltage polarization curve, and wherein estimating a polarization curve of the fuel cell stack includes estimating a polarization curve for both the average cell voltage and the minimum cell voltage, and wherein determining a cell voltage includes determining an average cell voltage and a minimum cell voltage at the current density for the selected sample region.

11. The method according to claim 9 wherein calculating the net power includes calculating the net power as a maximum cell voltage times an overall current density times a number of fuel cells in the fuel cell stack times an area of the fuel cells of the fuel cell stack minus a predetermined parasitic power that are used while running the fuel cell stack.

12. The method according to claim 11 further comprising adding a correction to the calculated maximum power.

13. The method according to claim 9 wherein determining the cell voltage includes using the equation:

$$E_{cell} = E_{rev} - (j+a) * R_{HFR} - \left(0.07 * \log_{10}\left(\frac{j+a}{j^0}\right) + c\log_{10}\left(1 - \frac{j}{j^\infty}\right)\right)$$

where $E_{cell}$ is the cell voltage, j is the current density, $R_{HFR}$ is the cell HFR resistance, $E_{rev}$ is the thermodynamic reversible cell potential, $\alpha$ is the background current density from cell shorting/cell crossover, $j^0$ is the exchange current density, $j^\infty$ is the limiting current density and c is the mass transfer coefficient.

14. The method according to claim 9 wherein separating a current density range of the fuel cell stack into a predetermined number of sample regions includes separating a current density range of 0.1-2.0 A/cm² into sample regions of 0.1 A/cm².

15. A system for estimating the maximum stack power from a fuel cell stack during operation of a fuel cell stack, said system comprising;
means for selecting an average cell voltage limit;
means for selecting a minimum cell voltage limit;
means for estimating a polarization curve of the fuel cell stack for both an average fuel cell and a minimum fuel cell voltage;
means for separating a current density range of the fuel cell stack into a predetermined number of sample regions;
means for selecting a first sample region;
means for determining an average cell voltage and a minimum cell voltage at the current density for the selected sample region;
means for determining whether the average cell voltage and the minimum cell voltage are less than the average cell voltage limit and the minimum cell voltage limit, respectively;
means for selecting a next sample region in the current density range if the average cell voltage is not less than the average cell voltage limit;
means for selecting a next sample region in the current density range if the minimum cell voltage is not less than the minimum cell voltage limit;
means for calculating a maximum net power for the average cell voltage when the average cell voltage is less than the average cell voltage limit and for calculating a maximum net power for the minimum cell voltage when the minimum cell voltage is less than the minimum cell voltage limit; and
means for selecting the less of the average cell voltage maximum net power and the minimum cell voltage maximum net power as a maximum stack power.

16. The system according to claim 15 wherein the means for calculating the net power includes means for calculating the net power as the maximum cell voltage times the overall current density times the number of fuel cells times the area of the fuel cells of the fuel cell stack minus predetermined parasitic power that are used while running the fuel cell system.

17. The system according to claim 15 wherein the average cell voltage limit is about 0.525 V and the minimum cell voltage limit is about 0.3 V.

18. The system according to claim 15 wherein separating a current density range of the fuel cell stack into a predetermined number of sample regions includes separating a current density range of 0.1-2.0 A/cm² into sample regions of 0.1 A/cm².

19. The system according to claim 15 wherein the fuel cell stack is a split fuel cell stack where the maximum stack power is determined for both spilt stacks.

20. The system according to claim 15 wherein the means for selecting a next sample region in the current density range includes means for selecting the next sample region in order from a low current density in the range to a high current density in the range.

* * * * *